United States Patent
Kim et al.

(10) Patent No.: US 10,755,070 B2
(45) Date of Patent: Aug. 25, 2020

(54) SENSOR PIXEL, FINGERPRINT AND IMAGE SENSOR INCLUDING THE SAME, AND DRIVING METHOD THEREOF

(71) Applicant: SILICON DISPLAY TECHNOLOGY, Yongin-si (KR)

(72) Inventors: Kijoong Kim, Suwon-si (KR); Taehan Go, Seoul (KR); Jin Hyeong Yu, Incheon (KR); Ji Ho Hur, Yongin-si (KR); Jong Woo Jin, Seoul (KR); Young Man Park, Gwangju-si (KR); Youn Duck Nam, Suwon-si (KR)

(73) Assignee: SILICON DISPLAY TECHNOLOGY, Yongin-si (KR)

( * ) Notice: Subject to any disclaimer, the term of this patent is extended or adjusted under 35 U.S.C. 154(b) by 0 days.

(21) Appl. No.: 16/214,296

(22) Filed: Dec. 10, 2018

(65) Prior Publication Data

US 2019/0180075 A1    Jun. 13, 2019

(30) Foreign Application Priority Data

Dec. 12, 2017 (KR) .................... 10-2017-0170662
Nov. 13, 2018 (KR) .................... 10-2018-0139420

(51) Int. Cl.
*G11C 7/00* (2006.01)
*G06K 9/00* (2006.01)
*H04N 5/3745* (2011.01)
*H04N 5/378* (2011.01)
*H04N 5/376* (2011.01)
*H04N 5/357* (2011.01)

(52) U.S. Cl.
CPC ......... *G06K 9/00033* (2013.01); *H04N 5/357* (2013.01); *H04N 5/376* (2013.01); *H04N 5/378* (2013.01); *H04N 5/3745* (2013.01); *G06K 2009/0006* (2013.01)

(58) Field of Classification Search
CPC ........................................................ H04N 5/35
USPC ........................................................ 365/190
See application file for complete search history.

(56) References Cited

U.S. PATENT DOCUMENTS

| 6,911,640 B1 | 6/2005 | Bencuya et al. |
| 2006/0157760 A1 | 7/2006 | Hayashi et al. |

(Continued)

FOREIGN PATENT DOCUMENTS

| JP | 2015-109590 | 6/2015 |
| KR | 10-1215124 | 12/2012 |

(Continued)

*Primary Examiner* — Abdul-Samad A Adediran
(74) *Attorney, Agent, or Firm* — Lex IP Meister, PLLC

(57) ABSTRACT

A fingerprint and image sensor includes a plurality of data lines, a plurality of scan lines, to which a plurality of scan signals is transferred, a plurality of reset scan lines, to which a plurality of reset scan signals is transferred, and a sensor panel, which is reset by a reset voltage, which is synchronized to a corresponding reset scan signal and is transferred, generates a pixel voltage according to light supplied during an exposure period, and includes a plurality of sensor pixels, which is synchronized to a corresponding scan signal and transfers the pixel voltage to a corresponding data line, and the exposure period may be a period from a time point, at which the corresponding reset scan signal is changed to an off-level, to a time point, at which the corresponding scan signal is changed to an on-level.

18 Claims, 9 Drawing Sheets

(56) References Cited

U.S. PATENT DOCUMENTS

| | | | |
|---|---|---|---|
| 2007/0109879 A1* | 5/2007 | Mabuchi | H04N 5/357 |
| | | | 365/190 |
| 2008/0135895 A1 | 6/2008 | Lee et al. | |
| 2008/0164403 A1 | 7/2008 | Hall et al. | |
| 2015/0163439 A1 | 6/2015 | Yoshioka | |

FOREIGN PATENT DOCUMENTS

| KR | 10-2014-0128636 | 11/2014 |
|---|---|---|
| KR | 10-2018-0116280 | 10/2018 |

\* cited by examiner

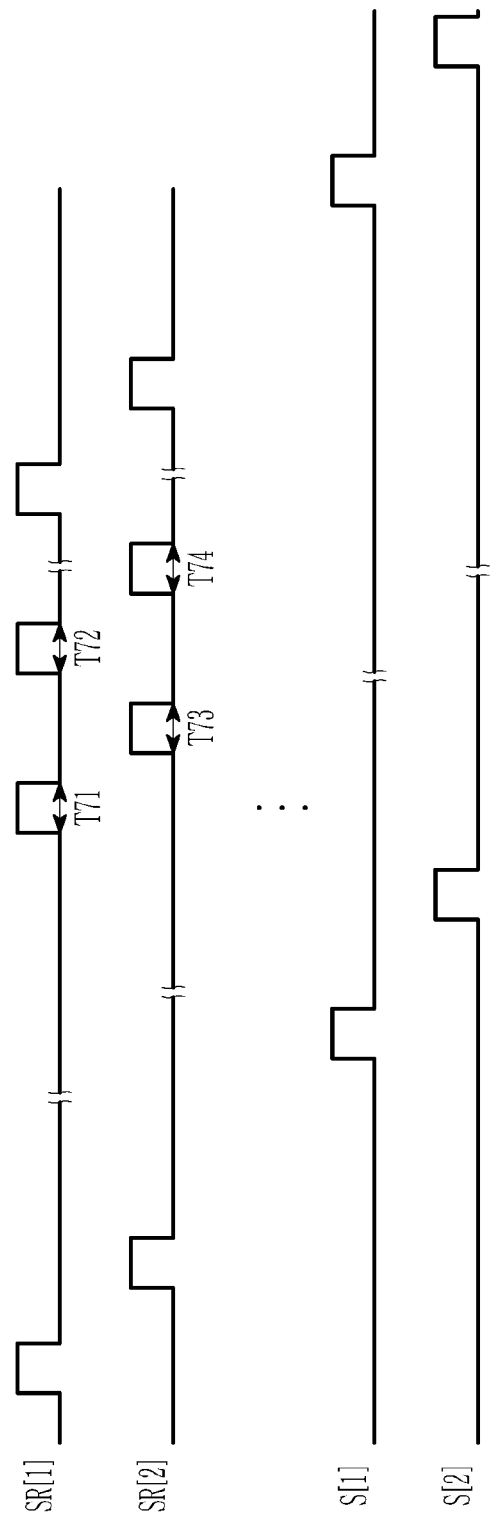

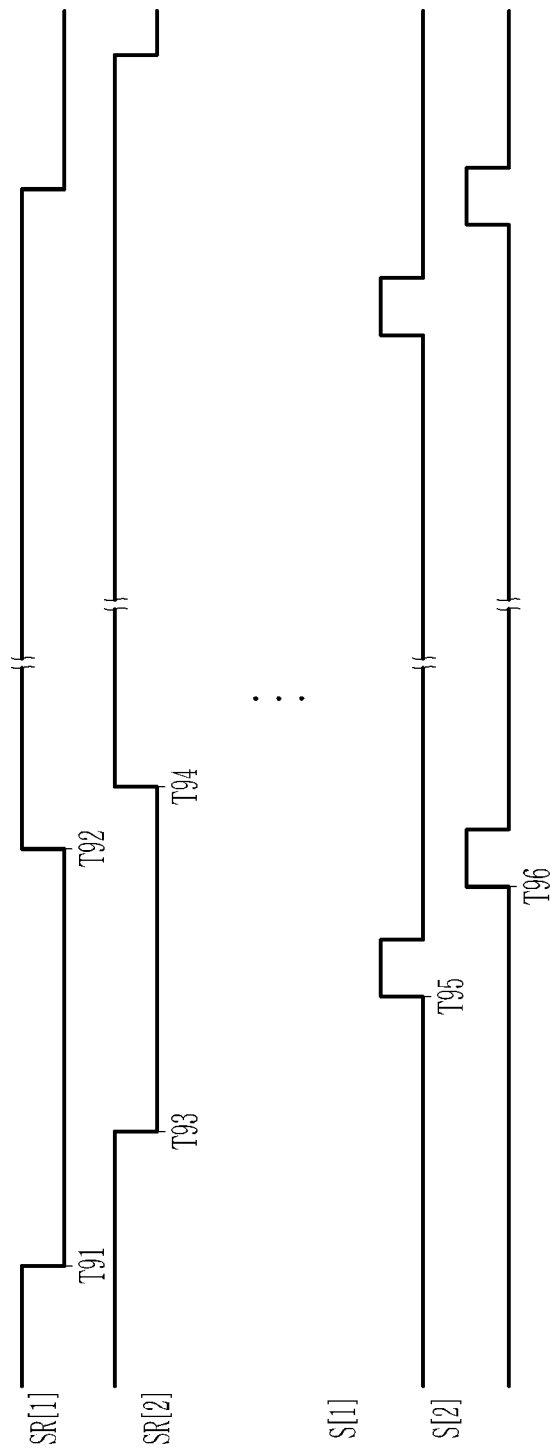

SENSOR PIXEL, FINGERPRINT AND IMAGE SENSOR INCLUDING THE SAME, AND DRIVING METHOD THEREOF

CROSS-REFERENCE TO RELATED APPLICATION

This application claims priority to and the benefit of Korean Patent Application No. 10-2017-0170662 and 10-2018-0139420 filed in the Korean Intellectual Property Office on Dec. 12, 2017 and Nov. 13, 2018, the entire contents of which are incorporated herein by reference.

BACKGROUND OF THE INVENTION (a) Field of the Invention

The present disclosure relates to an optical sensor pixel, a fingerprint and image sensor including the same, and a driving method thereof.

(b) Description of the Related Art

An optical fingerprint and image sensor recognizes an object based on the amount of light input to the sensor, so that the optical fingerprint and image sensor is influenced by the amount of light of a place, in which the sensor is located. When the fingerprint and image sensor is operated in an environment having the large amount of light, there is a problem in that it is difficult to accurately recognize an object due to an influence of neighboring light.

In order to solve the problem, circuits (a global shutter, a rolling shutter, and the like), which electrically block signals by using a shutter within a pixel when the amount of light is large, are developed. However, there is a problem in that image distortion is generated due to the blocking circuits using the shutters, and a driving speed of the fingerprint and image sensor is limited. The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a sensor pixel, which solves a problem in that it fails to recognize a fingerprint and an image due to an influence of the amount of light of a surrounding environment, and has no limit in a driving speed, a fingerprint and image sensor including the same, and a driving method thereof. An exemplary embodiment of the present invention provides a fingerprint and image sensor, including: a plurality of data lines, which is extended in a first direction and is arranged in a second direction; a reset voltage generating circuit, which generates a reset voltage according to the amount of external light; a sensor panel including a plurality of sensor pixels, which is reset by the reset voltage and generates a pixel voltage according to supplied light; and a sensing and reading circuit, which receives the pixel voltage through a corresponding data line among the plurality of data lines, and generates an output voltage based on the pixel voltage and a reference voltage.

Each of the plurality of sensor pixels may include: a reset transistor, which supplies the reset voltage to a first contact point during a first period; a photodiode, which is connected between the first contact point and a bias voltage; a capacity capacitor, which is connected to the photodiode in parallel; and a switching transistor, which transfers a pixel voltage, that is a voltage of the first contact point, to a corresponding data line during a second period.

The sensor panel may further include: a reset voltage line, which is connected to one end of the reset transistor and supplies the reset voltage; and a reset gate line, which is connected to a gate of the reset transistor and transfers a reset scan signal controlling a switching operation of the reset transistor, and the other end of the reset transistor may be connected to the first contact point.

The sensor panel may further include a scan line, which is connected to a gate of the switching transistor, and one end of the switching transistor may be connected to the data line, and the other end of the switching transistor may be connected to the first contact point.

The sensing and reading circuit may include: a multiplexing circuit, which multiplexes a plurality of pixel voltages supplied through the plurality of data lines and transfers a plurality of data voltages to a predetermined number of channels; and an amplifying circuit, which integrates a current introduced from the plurality of data lines and generates a plurality of output voltages.

The sensing and reading circuit may further include a signal processing circuit, which generates an image signal based on the plurality of output voltages and an address corresponding to each of the plurality of output voltages.

The multiplexing circuit may include a plurality of switches, each of which includes one end connected to each of n data lines among a plurality of data lines and the other end connected to the amplifying circuit, and performs a switching operation according to a corresponding switching signal.

The amplifying circuit may include: a calculation amplifier, which includes a first input terminal connected to the other end of the plurality of switches, a second input terminal, to which the reference voltage is input, and an output terminal; and a capacitor, which is connected between the first input terminal and the output terminal, and integrates a current introduced from the first input terminal and generates a corresponding output voltage.

The amplifying circuit may further include a reset switch, which is connected to the capacitor in parallel, and is turned on during a period between on-periods of the plurality of switches.

The corresponding reset scan signal may be the off-level during a predetermined period in a period of one frame, and the exposure period may be a period from a time point, at which the corresponding reset scan signal is changed from an on-level to an off-level, to a time point, at which the corresponding scan signal is changed to the on-level.

Another exemplary embodiment of the present invention provides a sensor pixel generating a pixel voltage according to supplied light, the sensor pixel including: a photodiode, which is connected between a first contact point and a bias voltage; a capacity capacitor, which is connected to the photodiode in parallel; a reset transistor, which supplies a reset voltage to the first contact point according to a reset scan signal; and a switching transistor, which transfers a pixel voltage that is a voltage of the first contact point to a data line according to a scan signal, in which the reset voltage is changed according to the amount of external light.

After the reset transistor is turned on and the voltage of the first contact point is reset to the reset voltage, the pixel voltage may be determined according to light supplied to the photodiode.

Still another exemplary embodiment of the present invention provides a method of driving a fingerprint and image sensor including a plurality of sensor pixels, the method including: generating a reset voltage according to the amount of external light; supplying a reset voltage to the plurality of sensor pixels; generating a plurality of pixel voltages according to light supplied by the plurality of sensor pixels; transferring the plurality of pixel voltages to a plurality of data lines; and generating a plurality of output voltages based on the plurality of pixel voltages and a reference voltage.

The generating of the plurality of output voltages may include: multiplexing the plurality of pixel voltages; and integrating a current introduced from a data line corresponding to the pixel voltage input according to the multiplexing and generating the plurality of output voltages.

A time period from a time point, at which the corresponding reset scan signal is change to an off-level, to a time point, at which the corresponding scan signal is changed to an on-level, may be an exposure period determining the pixel voltage.

The corresponding reset scan signal may have a predetermined phase difference with the same waveform as that of the corresponding scan signal.

The corresponding reset scan signal may have the on-level at least two times during a period of one frame, and the exposure period may be a period from a time point, at which the corresponding reset scan signal is changed from the on-level of one time between at least two times to the off-level, to a time point, at which the corresponding scan signal is changed to the on-level.

According to the exemplary embodiments of the present invention, it is possible to provide a sensor pixel, which is capable of adjusting an exposure time, a fingerprint and image sensor including the same, and a driving method thereof.

BRIEF DESCRIPTION OF THE DRAWINGS

FIG. 8 is a diagram illustrating a waveform of a reset scan signal according to still another exemplary embodiment.

FIG. 9 is a diagram illustrating a waveform of a reset scan signal according to yet another exemplary embodiment.

DETAILED DESCRIPTION OF THE EMBODIMENTS

A fingerprint and image sensor according to an exemplary embodiment may perform environment adaptation according to a change in light and be used without an influence of the amount of light of a surrounding environment. To this end, an operation area of the fingerprint and image sensor may be adjusted according to the intensity of light. A pixel reset voltage, which changes an operation area of the sensor according to the amount of light, may be applied to the fingerprint and image sensor. Particularly, a range of a pixel voltage corresponding to the detected amount of light is adjusted by changing a pixel reset voltage according to the amount of light, a voltage difference between a reference voltage for processing a signal and the pixel voltage is adjusted, and an operation area of the fingerprint and image sensor is shifted.

Hereinafter, an exemplary embodiment will be described in detail with reference to the drawings.

Figure 1:
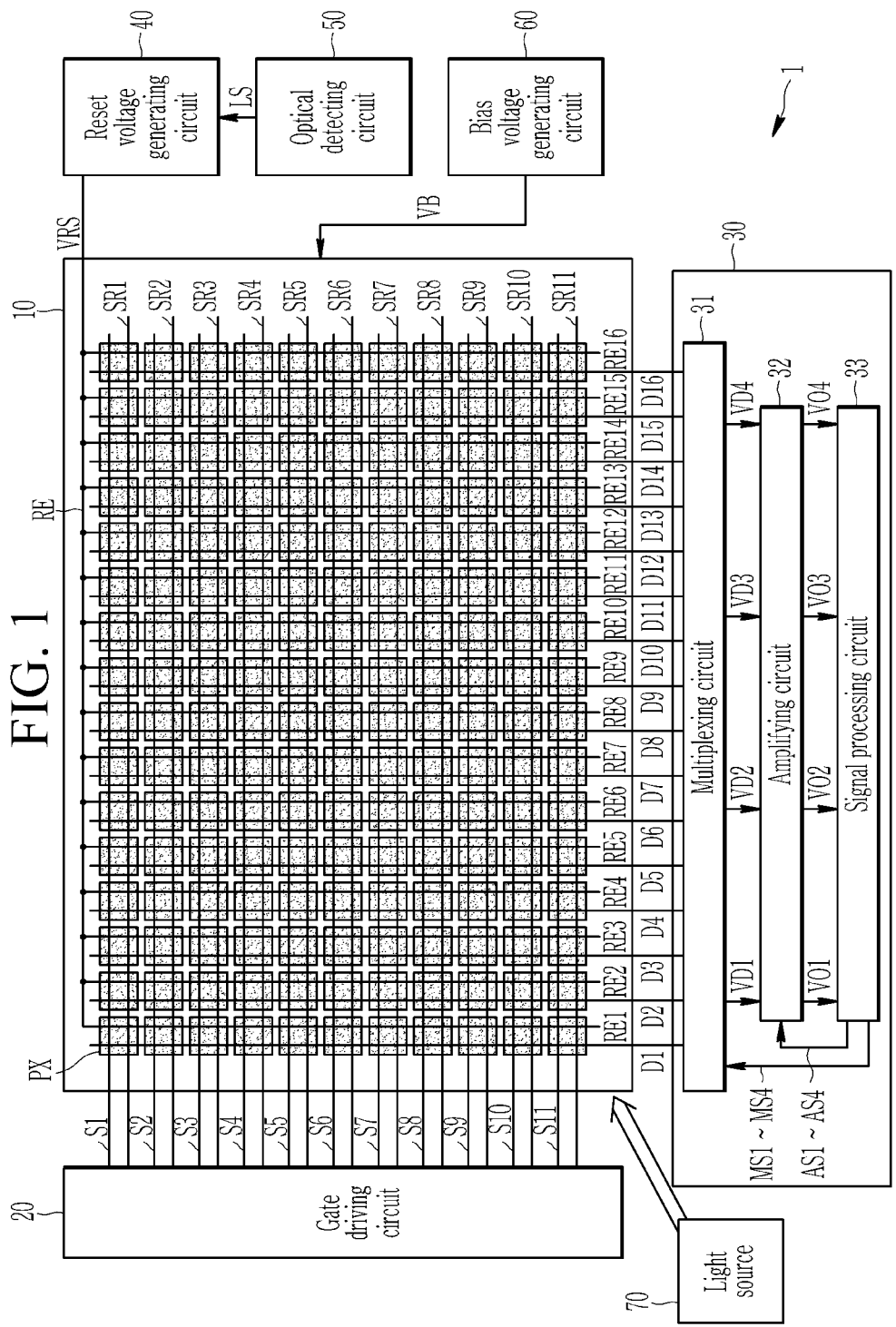
FIG. 1 is a diagram illustrating a configuration of a fingerprint and image sensor according to an exemplary embodiment.

FIG. 1 is a diagram illustrating a configuration of a fingerprint and image sensor according to an exemplary embodiment.

As illustrated in FIG. 1, a sensor 1 includes a sensor panel 10, a gate driving circuit 20, a sensing and reading circuit 30, a reset voltage generating circuit 40, an optical detecting circuit 50, a bias voltage generating circuit 60, and a light source 70.

A plurality of gate lines S1 to S11, a plurality of reset gate lines SR1 to SR11, a plurality of data lines D1 to D16, and reset voltage lines RE and RE1 to RE16 are positioned on the sensor panel 10. Although not illustrated in FIG. 1, a line, to which a bias voltage VB is supplied, may be positioned on the sensor panel 10. FIG. 1 illustrates the sensor panel 10 having a size of 16×11, which is, however, an example, and the present invention is not limited thereto.

The plurality of gate lines S1 to S11 is extended in a first direction (a horizontal direction in FIG. 1), and is arranged in a second direction (a vertical direction in FIG. 1) crossing the first direction. A scan signal corresponding to each of the plurality of rows of the sensor pixels is transferred through the plurality of gate lines S1 to S11.

The plurality of reset gate lines SR1 to SR11 is extended in the first direction (the horizontal direction in FIG. 1), and is arranged in the second direction, and is positioned to be parallel to the corresponding gate line. A reset scan signal corresponding to each of the rows of the plurality of sensor pixels is transferred through the plurality of reset gate lines SR1 to SR11.

The plurality of data lines D1 to D16 is extended in the second direction and is arranged in the first direction. A pixel voltage of each of the plurality of sensor pixels is transferred to the sensing and reading circuit 30 through the plurality of data lines D1 to D16.

Each of the plurality of sensor pixels PXs may be connected to the corresponding gate line, reset gate line, and data line, may be synchronized with the reset scan signal transferred through the corresponding reset gate line, so that the pixel voltage may be reset, and may be synchronized with the scan signal transferred through the corresponding gate line, so that the pixel voltage may be transferred to the corresponding data line.

The reset voltage line RE extended in the first direction and the reset voltage lines RE1 to RE16, which are extended from the reset voltage line RE in the second direction and correspond to the plurality of sensor pixel columns, may be positioned on the sensor panel 10. The reset voltage lines RE and RE1 to RE16 illustrated in FIG. 1 are the examples, and the present invention is not limited thereto.

The gate driving circuit 20 may sequentially generate the plurality of scan signals and supply the plurality of scan signals to the plurality of gate lines S1 to S11, and generate the plurality of reset scan signals and supply the plurality of reset scan signals to the plurality of reset gate lines SR1 to SR11.

In the exemplary embodiment, all of the sensor pixels PXs may be synchronized with the reset scan signal of an on-level and may be reset to a reset voltage VRS in the sensor panel 10, the plurality of scan signals of the on-level may be sequentially supplied to the plurality of sensor pixel rows.

The sensing and reading circuit 30 may amplify a voltage difference between each of the plurality of pixel voltages supplied from the plurality of data lines D1 to D16 and the reference voltage to generate a plurality of output voltages, and generate a fingerprint or image sensed according to the plurality of output voltages in the form of an image signal.

The sensing and reading circuit 30 includes a multiplexing circuit 31, an amplifying circuit 32, and a signal processing circuit 33.

The multiplexing circuit 31 may multiplex the plurality of pixel voltages supplied through the plurality of data lines D1 to D16 in a ratio of 4:1 and generate a plurality of data voltages VD1 to VD4. In the exemplary embodiment, the multiplexing circuit 31 is implemented with the 4:1 MUX, which is, however, an example, and the present invention is not limited thereto. The multiplexing circuit 31 includes a plurality of switches, one end of which is connected to each of the plurality of data lines D1 to D16. The plurality of switches may be grouped in the unit of four switches to form one channel. In FIG. 1, the number of plurality of data lines is 16, so that four channels are formed through the 4:1 MUX. The data voltages VD1 to VD4 are transferred to the amplifying circuit 32 through the four channels, respectively.

The amplifying circuit 32 generates output voltages VO1 to VO4 by amplifying a voltage difference between each of the data voltages VD1 to VD4 and the reference voltage and transfers the generated output voltages VO1 to VO4 to the signal processing circuit 33.

The signal processing circuit 33 may generate an image signal representing the output voltages VO1 to VO4 and a fingerprint or an image sensed based on an address corresponding to each of the output voltages VO1 to VO4.

The signal processing circuit 33 may generate switching signals MS1 to MS4 controlling the switches of the multiplexing circuit 31, and generate reset signals AS1 to AS4 resetting the output of the amplifying circuit 32. The signal processing circuit 33 may recognize a position of the sensor pixel row, which is synchronized at a time point, at which each of the plurality of scan signals becomes an on-level and to which the scan signal of the on-level is transferred, and control the switching operation of the multiplexing circuit 31, thereby recognizing a position of the sensor pixel column input through each of the channels. Accordingly, it is possible to recognize addresses of the sensor pixels corresponding to the output voltages VO1 to VO4 supplied from the amplifying circuit 32.

In the case of the optical fingerprint recognition, the signal processing circuit 33 may generate an image signal representing the output voltages VO1 to VO4 and a fingerprint or an image sensed based on the address corresponding to each of the output voltages VO1 to VO4.

The optical detecting circuit 50 detects the amount of light of an environment, in which the finger and image sensor 1 is positioned, and transfers an optical detection signal LS indicating information on the amount of light to the reset voltage generating circuit 40.

The reset voltage generating circuit 40 determines a level of the reset voltage VRS based on the optical detection signal LS, and generates the reset voltage VRS and supplies the reset voltage VRS to the reset voltage line RE. For example, the reset voltage generating circuit 40 may increase the reset voltage VRS as the amount of light is increased, and decrease the reset voltage VRS as the amount of light is decreased. However, in this case, the reset voltage VRS may be decreased to the reference voltage.

The bias voltage generating circuit 60 generates the bias voltage VB and supplies the generated bias voltage VB to the sensor panel 10, and the bias voltage VB is supplied to each of the plurality of sensor pixels PX through a bias voltage line.

The light source 70 provides light required for the optical fingerprint and image sensing. The light source 70 may be positioned on a rear surface of the sensor panel 10 and provide light to a front surface.

Figure 2:
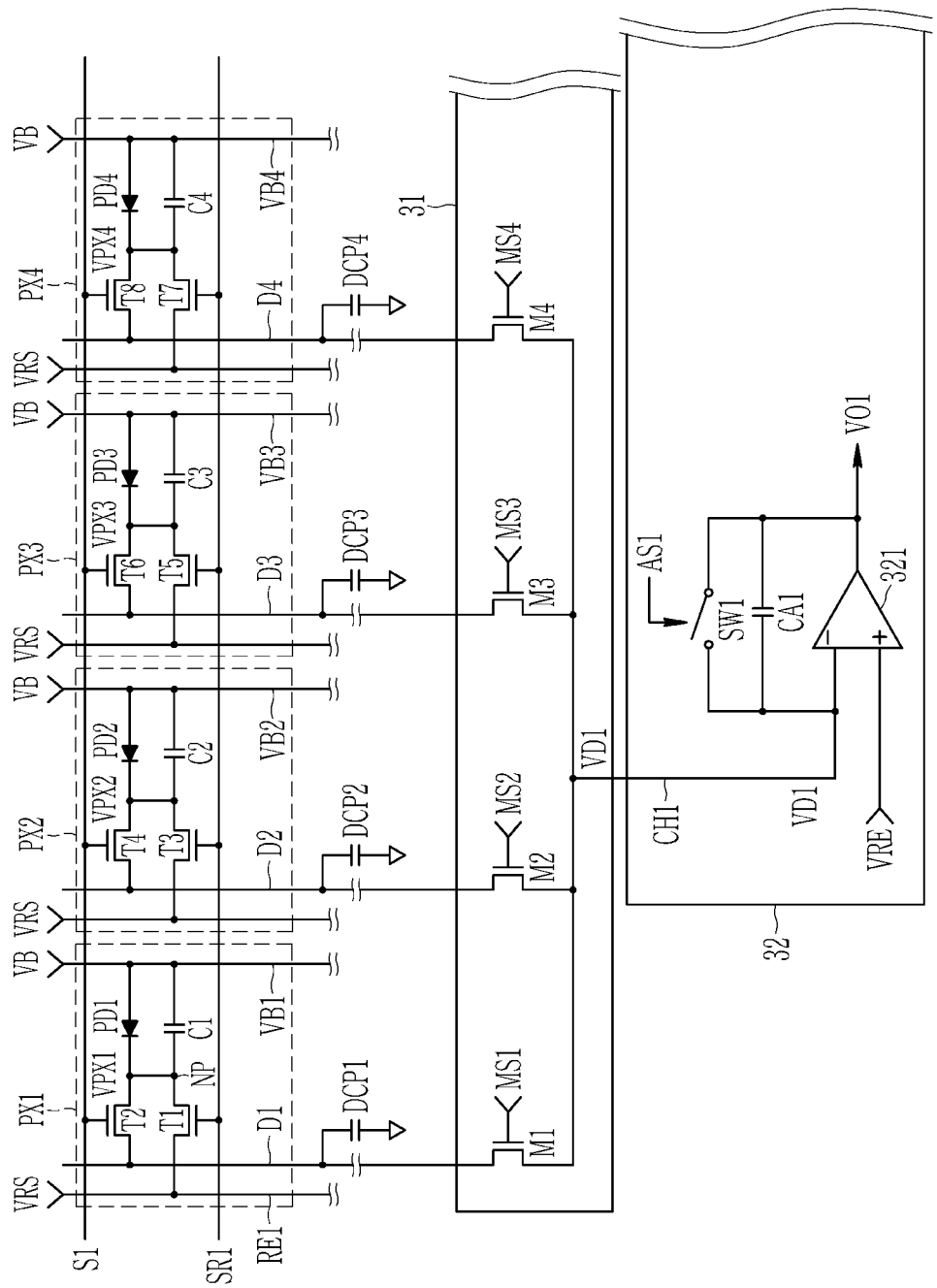
FIG. 2 is a diagram illustrating parts of a plurality of sensor pixels, multiplexing circuits, and amplifying circuits according to the exemplary embodiment.

FIG. 2 is a diagram illustrating the parts of the plurality of sensor pixels, the multiplexing circuits, and the amplifying circuits according to the exemplary embodiment.

FIG. 2 illustrates four sensor pixels PX1 to PX4 of the first sensor pixel row, four switches M1 to M4 connected to four data lines D1 to D4 in the multiplexing circuit 31, and one calculation amplifier 321 connected to the channels corresponding to the four data lines D1 to D4 in the amplifying circuit 32. Those skilled in the art may be aware of the entire configuration based on the partial configuration illustrated in FIG. 2.

Each of the sensor pixels PX1 to PX4 is connected to a corresponding data line (one of the data lines D1 to D4), a corresponding reset voltage lines (one of the reset voltage lines RE1 to RE4), a corresponding bias voltage line (one of the bias voltage lines VB1 to VB4), the gate line S1, and the reset gate line SR1.

The sensor pixels PX1 to PX4 include switching transistors T2, T4, T6, and T8 switched by a scan signal S[1], reset transistors T1, T3, T5, and T7 switched by a reset scan signal SR, photodiodes PD1 to PD4, and capacitors C1 to C4, respectively. A connection relation between the switching transistor, the reset transistor, the photodiode, and the capacitor in each of the sensor pixels PX1 to PX4 is the same, so that only the sensor pixel PX1 will be described.

The reset transistor T1 includes a gate electrode connected to the reset gate lines SR1, one electrode connected to the reset voltage line RE1, and the other electrode connected to a contact point NP. The switching transistor T2 includes a gate electrode connected to the gate lines S1, one electrode connected to the data D1, and the other electrode connected to a contact point NP. The photodiode PD1 includes an anode electrode connected to the bias voltage line VB1 and a cathode electrode connected to the contact point NP. The capacitor C1 includes one electrode connected to the bias voltage line VB1 and the other electrode connected to the contact point NP. Hereinafter, a voltage of the contact point NP is referred to as a pixel voltage VPX.

Capacitance is formed between each of the data lines D1 to D4 and another adjacent electrode (not illustrated), and the corresponding capacitance is illustrated with the data line capacitors DCP1 to DCP4 in FIG. 2. The data line capacitors DCP1 to DCP4 are electrically connected to the data lines D1 to D4, respectively.

In the multiplexing circuit 31, the switch M1 includes one electrode connected to the data line D1, the other electrode connected to the channel CH1, and a gate electrode, to which the switching signal MS1 is supplied, the switch M2 includes one electrode connected to the data line D2, the other electrode connected to the channel CH1, and a gate electrode, to which the switching signal MS2 is supplied, the switch M3 includes one electrode connected to the data line D3, the other electrode connected to the channel CH1, and a gate electrode, to which the switching signal MS3 is supplied, and the switch M4 includes one electrode connected to the data line D4, the other electrode connected to the channel CH1, and a gate electrode, to which the switching signal MS4 is supplied.

In the amplifying circuit 32, the calculation amplifier 321 includes a non-inverting terminal (+), to which the reference voltage VRE is input, an inverting terminal (−), to which the data voltage VD1 is input through the channel CH1, and an output terminal, from which the output voltage VO1 is output. A feedback capacitor CA1 is connected between the inverting terminal (−) and the output terminal of the calculation amplifier 321, and the reset switch SW1 is connected to the feedback capacitor CA1 in parallel. The reset switch SW1 may be switching-operated by the reset signal AS1.

When the reset switch SW1 of the calculation amplifier 321 is turned on, the output values of the channel CH1 between the switches M1, M2, M3, and M4 and the calculation amplifier 321 and the calculation amplifier 321 are reset to the reference voltage VRE. After the reset, a current flows into the channel CH1 from the sensor pixel PX1 during an on-period of the switch M1, and the inflow current is integrated by the capacitor CA1 of the calculation amplifier 321. Then, the output voltage VO1 is generated as a voltage based on a result of the integral in the capacitor CA1. In this case, capacity of the capacitor CA1 and the output voltage VO1 has an inverse proportion relation. Accordingly, even though the amount of charges flowing into the channel CH1 from the sensor pixel PX1 is the same, as the capacity of the capacitor CA1 is larger, the output voltage VO1 is decreased, and as the capacity of the capacitor CA1 is smaller, the output voltage VO1 is increased.

Hereinafter, an operation of the fingerprint and image sensor according to the exemplary embodiment will be described with reference to FIGS. 3 and 4.

Figure 3:
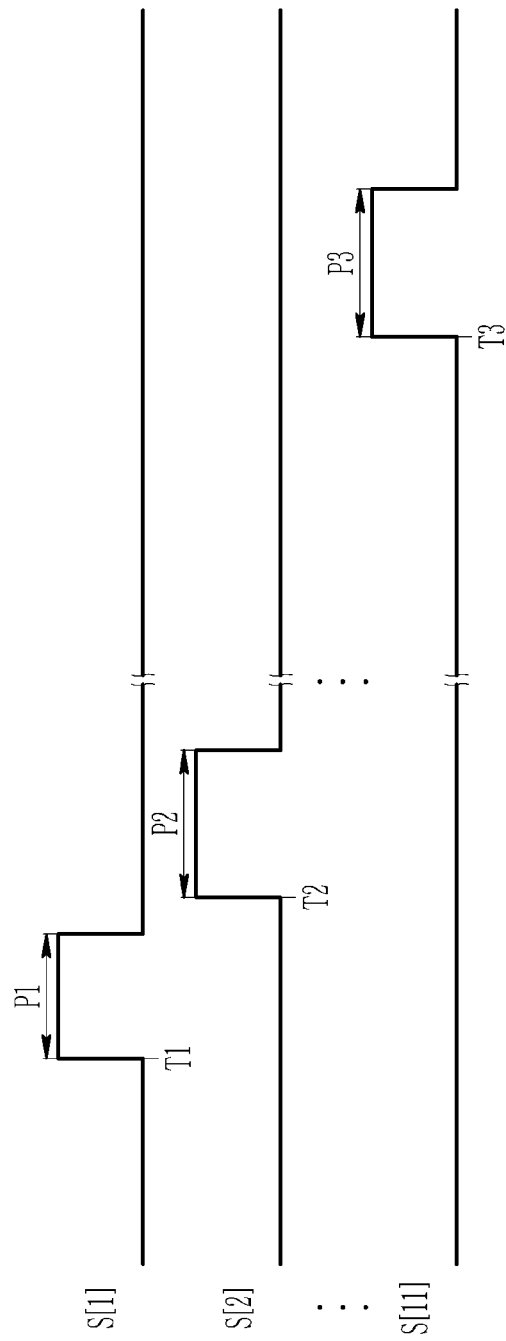
FIG. 3 is a waveform diagram illustrating scan signals.

FIG. 3 is a waveform diagram illustrating the scan signals. FIG. 4 is a waveform diagram illustrating the switching signals and the reset signals.

The level of the plurality of reset scan signals SR1 to SRn may be changed from the on-level to an off-level before the on-level of the corresponding scan signal. This will be described below in detail. When the plurality of reset scan signals SR[1] to SR[11] becomes a high level, which is the on-level, the reset transistors of all of the sensor pixels PXs are turned on. Then, the pixel voltages VPXs of all of the sensor pixels PXs become the reset voltage.

Next, the scan signals S[1] to S[11] of the on-level are sequentially supplied from the gate line S1 to the gate line S11. For example, the scan signal S[1] becomes a high level, which is the on-level, during period P1 from time point T1, next, the scan signal S[2] becomes a high level, which is the on-level, during period P2 from time point T2, and the scan signal S[11] becomes a high level, which is the on-level, during period P3 from time point T3. The on-level period of each of the scan signals S[1] to S[11] may be the same.

After the reset scan signal becomes the off-level, light supplied from the light source 70 may be reflected to an object to be recognized and be recognized by the sensor pixel PX. For example, when a fingerprint is recognized, in the case of a ridge of the fingerprint, the ridge of the fingerprint is in close contact with the sensor panel 10, so that the amount of light reflected from the light source 70 to the sensor pixel PX is large, and in the case of a valley of the fingerprint, the amount of light reflected from the light source 70 to the sensor pixel PX is relatively small by a space between the valley of the fingerprint and the sensor panel 10.

A current flows in the photodiodes PD1 to PD4 (see FIG. 2) according to the amount of light incident to each of the sensor pixels PXs. In this case, a direction of the current flowing in the photodiode is a direction from the cathode to the anode, and charges of the capacitors C1 to C4 (see FIG. 2) are discharged by the currents flowing in the photodiodes. Then, the degree of discharging of the capacitor is different according to the amount of light incident to each of the sensor pixels PXs, so that the pixel voltage VPX is determined according to the amount of light. For example, as the amount of light is increased, the pixel voltage VPX may be decreased.

The pixel voltages VPX1 to VPX4 (FIG. 2) are transferred to the multiplexing circuit 31 through the data lines D1 to D16 during the on-level period of each of the scan signals S[1] to S[11] and the multiplexing circuit 31 multiplexes the pixel voltages transferred from the corresponding data lines to output the multiplexed pixel voltages as the data voltages VD1 to VD4. In this case, the data line capacitors DCP1 to DCP4 (see FIG. 2) may maintain the pixel voltages transferred through the data lines.

Figure 4:
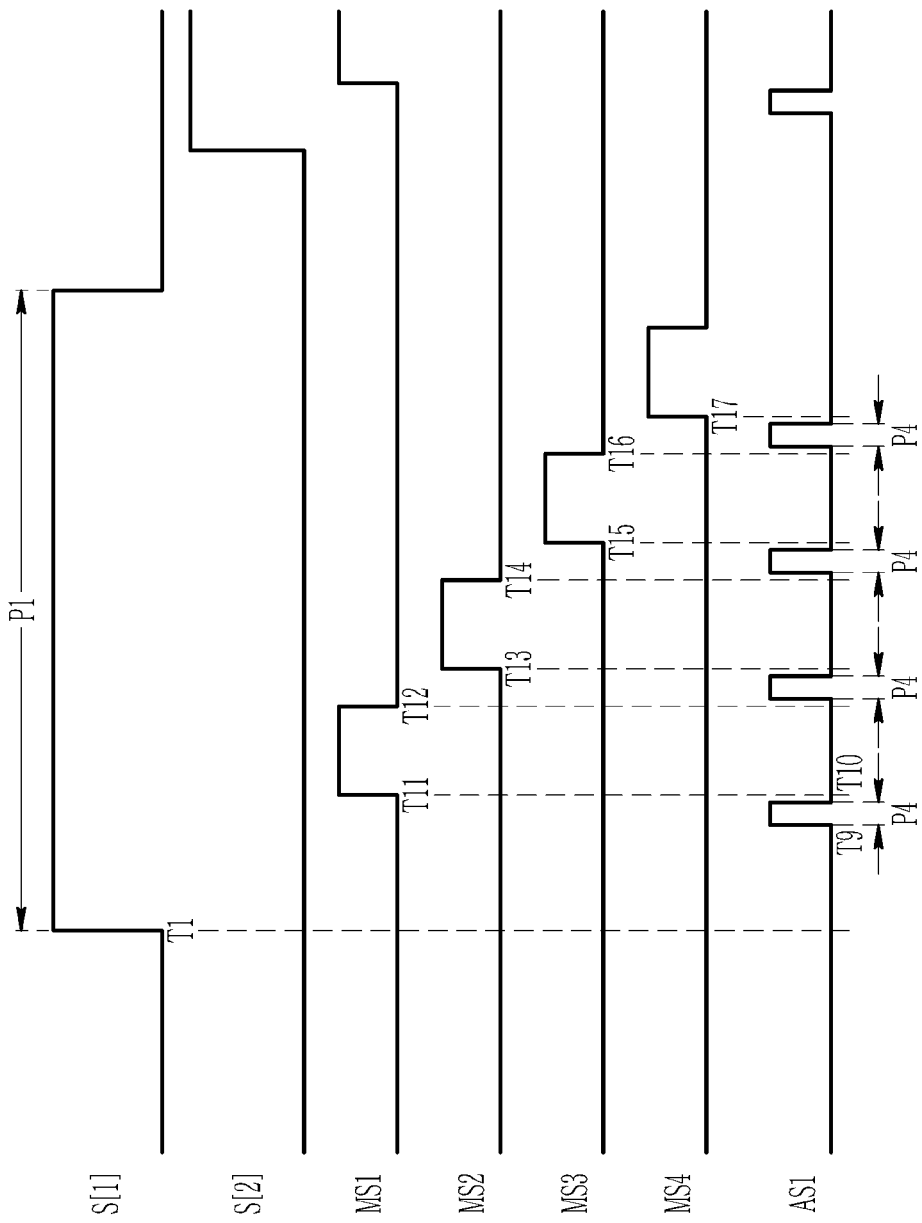
FIG. 4 is a waveform diagram illustrating switching signals and reset signals.

As illustrated in FIG. 4, the switching signals MS1 to MS4 may sequentially become the high level, which is the on-level, during on-level period P1 of the scan signal S[1].

First, in a period between T9 and T10, the reset signal AS1 becomes the high level, which is the on-level, and the reset switch SW1 is turned on during period P4, so that the output voltage VO1 may be set to the reference voltage VRE.

During a period between T11 and T12, the switching signal MS1 becomes the high level and the switch M1 is turned on, the current flows in from the sensor pixel PX1 through the data line D1, the inflow current is integrated by the capacitor CA1 of the calculation amplifier 321, so that the output voltage VO1 is generated. During a period between T13 and T14, the switching signal MS2 becomes the high level and the switch M2 is turned on, the current flows in from the sensor pixel PX2 through the data line D2, the inflow current is integrated by the capacitor CA1 of the calculation amplifier 321, so that the output voltage VO1 is generated. During a period between T15 and T16, the switching signal MS3 becomes the high level and the switch M3 is turned on, the current flows in from the sensor pixel PX3 through the data line D3, the inflow current is integrated by the capacitor CA1 of the calculation amplifier 321, so that the output voltage VO1 is generated. During a period between T17 and T18, the switching signal MS4 becomes the high level and the switch M4 is turned on, the current flows in from the sensor pixel PX4 through the data line D4, the inflow current is integrated by the capacitor CA1 of the calculation amplifier 321, so that the output voltage VO1 is generated.

In each of the periods between T12 and T13, T14 and T15, and T16 and T17, the reset signal AS1 becomes the high level, which is the on-level, and the reset switch SW1 is turned on during period P4, so that the output voltage VO1 may be reset to the reference voltage VRE. The on-level period of the reset signal AS1 may be period P4, which is uniform.

Figure 5:
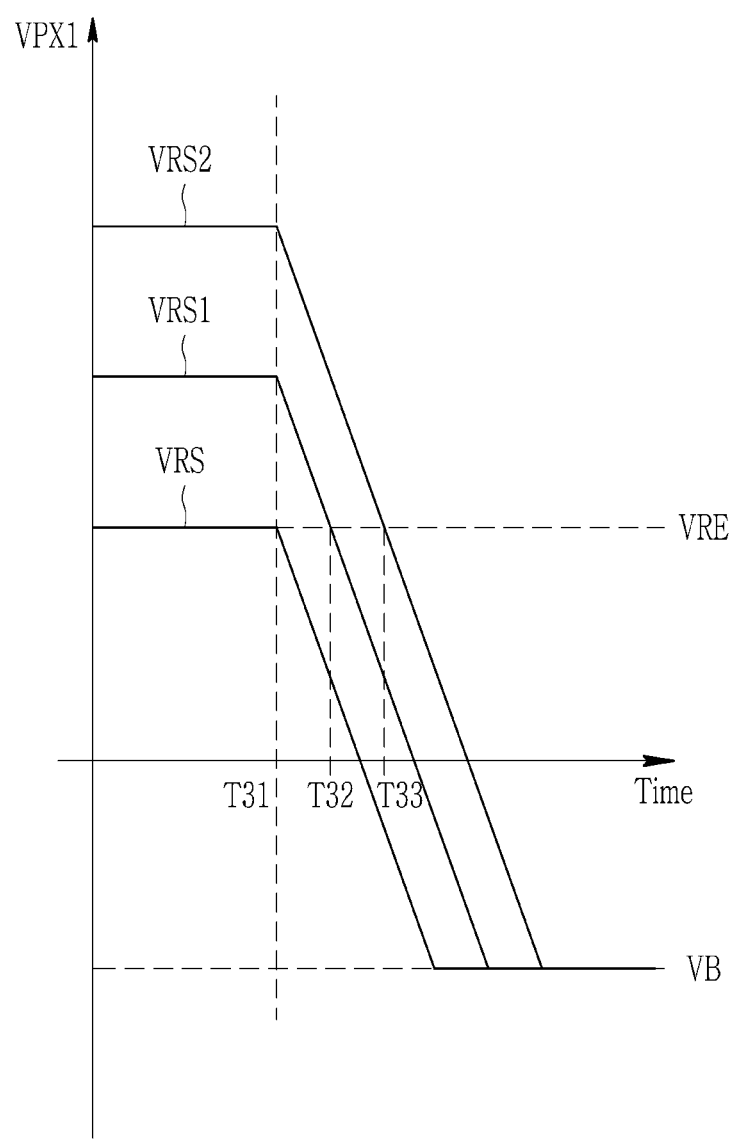
FIG. 5 is a waveform diagram illustrating a pixel voltage according to a change in a reset voltage according to the amount of light.

FIG. 5 is a waveform diagram illustrating a pixel voltage according to a change in a reset voltage according to the amount of light.

FIG. 5 illustrates the pixel voltage VPX1 of the sensor pixel PX1. The pixel voltages of other pixel circuits have the same waveform, so that the description thereof will be omitted.

As illustrated in FIG. 5, the reset voltage generating circuit 40 may set the reset voltage VRS based on the optical detection signal LS.

For example, when the optical detection signal LS indicates a predetermined threshold light amount value or less, the reset voltage generating circuit 40 may set the reset voltage VRS with the reference voltage VRE.

Then, the pixel voltage (for example, VRX1) may be maintained with the reset voltage VRS before time point T31, and when light is supplied from the light source 70 after time point T31, the pixel voltage VRX1 may be determined by the current flowing in the photodiode PD1. As the amount of light reflected to the sensor pixel (for example, PX1) is increased, the pixel voltage VPX1 is decreased.

When the switching transistor T2 and the switch M1 are turned on after time point T31, a current flows in from the sensor pixel PX1 and the inflow current is integrated by the capacitor CA1 of the calculation amplifier 321, so that the output voltage VO1 is generated. When the data voltage VD1 is larger than the reference voltage VRE, the output voltage VO1 is saturated to a power voltage of the calculation amplifier 321, so that the output voltage VO1 according to the data voltage VD1 is not generated. Accordingly, the output voltage VO1 may be generated after time point T31, at which the data voltage VD1 is decreased to the reference voltage VRE.

For another example, when the optical detection signal LS indicates a predetermined first level, which is the predetermined threshold light amount value or more, the reset voltage generating circuit 40 may set the reset voltage VRS with a reset voltage VRS1 that is higher than the reference voltage VRE.

Then, as illustrated in FIG. 5, the pixel voltage VPX1 may be maintained with the reset voltage VRS1 before time point T31, and when light is supplied from the light source 70 after time point T31, the pixel voltage VPX1 may be determined by the current flowing in the photodiode PD1. When the switching transistor T2 and the switch M1 are turned on after time point T31, the current introduced from the sensor pixel PX1 is integrated by the capacitor CA1 of the calculation amplifier 321 after time point T32, at which the data voltage VD1 is decreased to the reference voltage VRE, so that the output voltage VO1 may be generated.

For another example, when the optical detection signal LS indicates a predetermined second level (>the first level), which is the predetermined threshold light amount value or more, the reset voltage generating circuit 40 may set the reset voltage VRS with a reset voltage VRS2 that is higher than the reset voltage VRS1.

Then, as illustrated in FIG. 5, the pixel voltage VPX1 may be maintained with the reset voltage VRS2 before time point T31, and when light is supplied from the light source 70 after time point T31, the pixel voltage VPX1 may be determined by the current flowing in the photodiode PD1. When the switching transistor T2 and the switch M1 are turned on after time point T31, the current introduced from the sensor pixel PX1 is integrated by the capacitor CA1 of the calculation amplifier 321 after time point T33, at which the data voltage VD1 is decreased to the reference voltage VRE, so that the output voltage VO1 may be generated.

As illustrated in FIG. 5, as the light supplied to the sensor pixel PX1 is increased, the pixel voltage VPX1 may be decreased and decreased to the bias voltage VB.

Figure 6:
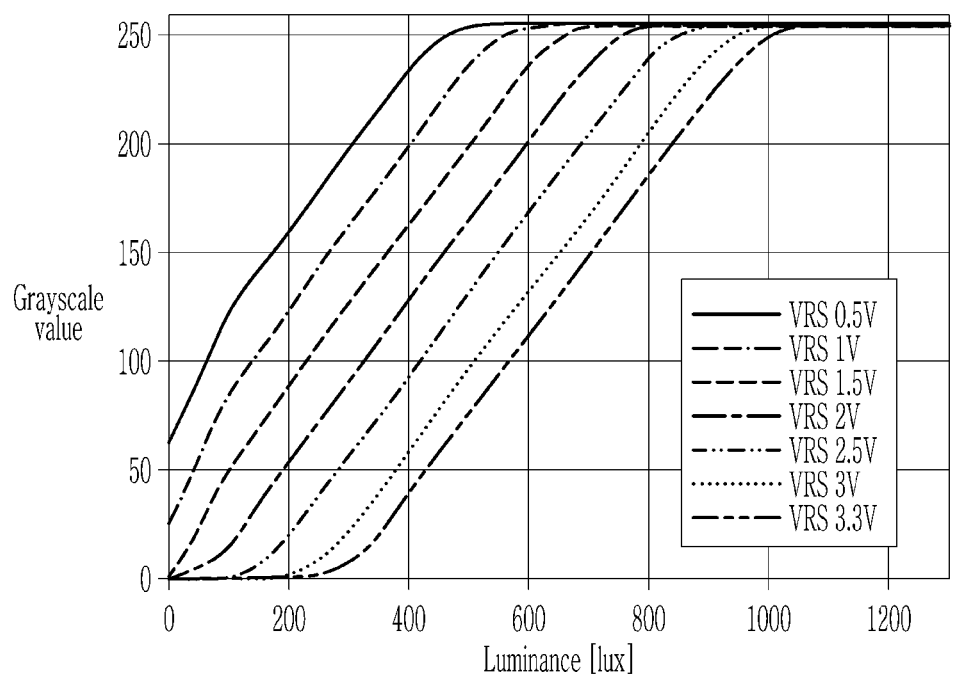
FIG. 6 is a graph illustrating a relation between illuminance and a grayscale value of the fingerprint and image sensor according to a change in a reset voltage according to the exemplary embodiment.

FIG. 6 is a graph illustrating a relation between illuminance and a grayscale value of the fingerprint and image sensor according to a change in a reset voltage according to the exemplary embodiment.

As illustrated in FIG. 6, it can be seen that when the reset voltage VRS is varied to 0.5 V, 1 V, 1.5 V, 2 V, 2.5 V, 3 V, and 3.3 V, operation areas are shifted without a change in inclinations of the curves of luminance and a grayscale value. Luminance may be luminance of light supplied to the sensor pixels, and a grayscale value may mean an image signal generated by the signal processing circuit 33 based on the output voltages VO1 to VO4.

Sensitivity of the fingerprint and image sensor 1 follows the inclination of the luminance and grayscale value curve, and as can be seen in FIG. 6, the operation area is only shifted without a change in sensitivity.

When a value of the reset voltage VRS is increased as the amount of light of an external environment is increased, the operation area of the fingerprint and image sensor 1 may be increased compared to that of the related art.

For example, it is assumed that luminance of the external environment is 400 lux, and the amount of light of the external environment is supplied to the sensor pixel PX1 without a change. In this case, when the reset voltage VRS is 0.5 V, the operation area of the fingerprint and image sensor 1 is a range of about grayscale values 230 to 250. As the reset voltage VRS is increased, the operation area of the fingerprint and image sensor 1 is increased, and when the reset voltage VRS is 3.3 V, the operation area is in the range of about grayscale values 40 to 250.

As described above, according to the exemplary embodiment, the reset voltage is set according to the amount of external light, thereby providing an effect in that it is possible to secure an operation area without a change in sensitivity of the fingerprint and image sensor.

Figure 7:
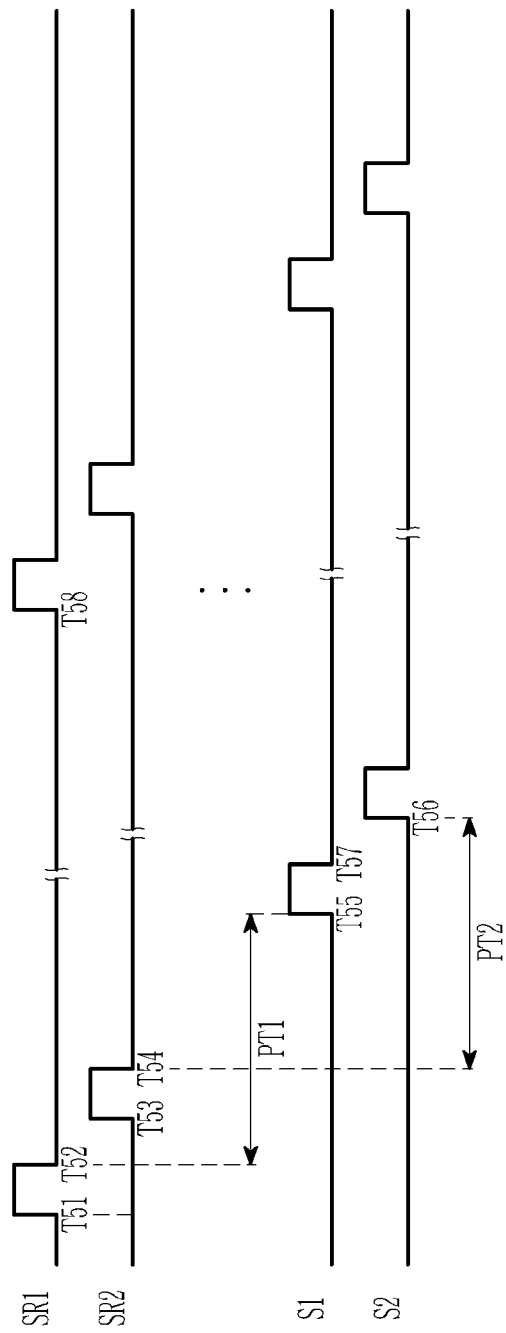
FIG. 7 is a diagram illustrating a waveform of a reset scan signal according to another exemplary embodiment.

FIG. 7 is a diagram illustrating a waveform of a reset scan signal according to another exemplary embodiment.

As illustrated in FIG. 7, a reset scan signal SR[1] becomes a high level, which is an on-level, during a period between T51 and T52. A scan signal S[1] corresponding to the reset scan signal SR[1] is increased to the high level, which is the on level, at time point T55. Then, all of the sensor pixels of a corresponding sensor pixel row (for example, the first sensor pixel row) are exposed to light during period PT1 (T52 to T55). That is, it is possible to adjust an exposure time by adjusting a time period from a decreasing edge of the reset scan signal SR[1] to an increasing edge of the scan signal S[1].

Next, a reset scan signal SR[2] becomes the high level, which is the on level, during a period between T53 and T54. A scan signal S[2] corresponding to the reset scan signal SR[2] is increased to the high level, which is the on level, at time point T56. Then, all of the sensor pixels of a corresponding sensor pixel row (for example, the second sensor pixel row) have an exposure time during period PT2 (T54 to T56).

By the foregoing scheme, the plurality of reset scan signals and the plurality of scan signal are generated.

When the reset scan signal SR[1] becomes the on-level, so that a transistor T1 is turned on, a voltage of a node NP is reset. When the reset scan signal SR[1] becomes an off-level, a signal is accumulated in the capacitor C1 from this time. After the exposure time T52 to T55, when the corresponding scan signal S[1] becomes the on-level, the transistor T2 is turned on and the signal accumulated in the capacitor C1 is transmitted to a data line. Then, when the scan signal becomes the off-level at time point T57, the signal starts to be accumulated in the capacitor C1 again, and when the reset scan signal SR[1] becomes the on-level again, the voltage of the node NP is reset and the signals accumulated during the period (for example, the period between T57 and T58) is discarded.

As illustrated in FIG. 7, when the waveforms of the scan signal and the reset scan signal are similar to each other, a circuit structure of a gate driving circuit for generating the reset scan signal may be the same as a circuit structure of a shift register for generating the scan signal. As described above, it is possible to adjust an exposure time by using a phase difference between the scan signal and the reset scan signal.

FIG. 8 is a diagram illustrating a waveform of a reset scan signal according to still another exemplary embodiment.

As illustrated in FIG. 8, a reset scan signal becomes an on-level at least two times during one frame period.

For example, a reset scan signal SR[1] becomes the on level again during periods T71 and T72 after a scan signal S[1] becomes the on-level and a signal accumulated in the capacitor C1 is transmitted to a data line. A reset scan signal SR[2] becomes the on level again during periods T73 and T74 after a scan signal S[2] becomes the on-level and a signal accumulated in the capacitor C1 is transmitted to the data line.

FIG. 8 illustrates the case where the reset scan signals SR[1] and SR[2] become the on-level two more times, but the present invention is not limited thereto, and the reset scan signal may be additionally become the on-level at least one more time after the signal is transmitted to the data line. For example, after the signal is transmitted to the data line, the reset scan signal may periodically become the on-level.

A gate driving circuit may additionally become the on-level at least one more time during one frame period or use a start pulse signal, which periodically becomes the on-level, in order to generate the reset scan signal illustrated in FIG. 8.

In another exemplary embodiment illustrated in FIG. 7, during the period between T57 and T58, which is from the time point, at which the scan signal becomes the off level, to the time point, at which a next reset scan signal becomes the on level, the signals, which are not actually read, are accumulated in the capacitor C1. When a leakage current is generated through the transistor T2, the leakage current influences the data line, thereby influencing a signal read through the data line.

Particularly, when the amount of light of an object-to-be recognized is large, so that an exposure time is decreased, the period between T57 and T58 is increased, so that the signal accumulated in the capacitor C1 becomes intensive, and a probability in that the leakage current is generated through the transistor T2 is increased. Then, there may be generated interference between the sensor pixels sharing the data line.

In still another exemplary embodiment illustrated in FIG. 8, the reset scan signals become additionally the on-level to reset the signal accumulated in the capacitor C1, thereby preventing the foregoing problem. However, when the reset scan signal periodically becomes the on-level, coupling is generated between the reset gate line and the data line crossing the reset gate line, thereby influencing the signal transmitted through the data line.

FIG. 9 is a diagram illustrating a waveform of a reset scan signal according to yet another exemplary embodiment.

As illustrated in FIG. 9, a reset scan signal becomes an off-level only in a predetermined section in one frame period.

For example, a reset scan signal SR[1] of an on-level is decreased to a low level, which is the off-level, at time point T91. At time point S95, a scan signal S[1] becomes the on-level, and an exposure time of the first sensor pixel row is controlled to T91 to T95. Next, a reset scan signal SR[2] of an on-level is decreased to a low level, which is the off-level, at time point T93. At time point S96, a scan signal S[1] becomes the on-level, and an exposure time of the first sensor pixel row is controlled to T93 to T96.

According to the scheme, the sensor pixel does not have a signal, which is not to be read, for a long time, and a leakage current through the transistor T2 is sharply decreased. Further, it is possible to block an influence by coupling between the data line and the reset gate line.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: Sensor
10: Sensor panel
20: Gate driving circuit
30: Sensing and reading circuit
40: Reset voltage generating circuit
50: Optical detecting circuit
60: Bias voltage generating circuit
70: Light source

What is claimed is:

1. A fingerprint and image sensor, comprising:
a plurality of data lines, which is extended in a first direction and is arranged in a second direction;
a reset voltage generating circuit, which generates a reset voltage according to an amount of external light;
a sensor panel including a plurality of sensor pixels, which is reset by the reset voltage and generates a pixel voltage according to supplied light; and
a sensing and reading circuit, which receives the pixel voltage through a corresponding data line among the plurality of data lines, and generates an output voltage based on the pixel voltage and a reference voltage,
wherein the sensing and reading circuit includes:
a multiplexing circuit, which multiplexes a plurality of pixel voltages supplied through the plurality of data lines and transfers a plurality of data voltages to a predetermined number of channels; and
an amplifying circuit, which integrates a current introduced from the plurality of data lines and generates a plurality of output voltages.

2. The fingerprint and image sensor of claim 1, wherein:
each of the plurality of sensor pixels includes:
a reset transistor, which supplies the reset voltage to a first contact point during a first period;
a photodiode, which is connected between the first contact point and a bias voltage;
a capacity capacitor, which is connected to the photodiode in parallel; and
a switching transistor, which transfers the pixel voltage, that is a voltage of the first contact point, to the corresponding data line during a second period.

3. The fingerprint and image sensor of claim 2, wherein:
the sensor panel further includes:

a reset voltage line, which is connected to one end of the reset transistor and supplies the reset voltage; and a reset gate line, which is connected to a gate of the reset transistor and transfers a reset scan signal controlling a switching operation of the reset transistor, and another end of the reset transistor is connected to the first contact point.

4. The fingerprint and image sensor of claim 2, wherein:
the sensor panel further includes:
a scan line, which is connected to a gate of the switching transistor, and
one end of the switching transistor is connected to the corresponding data line, and another end of the switching transistor is connected to the first contact point.

5. The fingerprint and image sensor of claim 1, wherein:
the sensing and reading circuit further includes
a signal processing circuit, which generates an image signal based on the plurality of output voltages and an address corresponding to each of the plurality of output voltages.

6. The fingerprint and image sensor of claim 1, wherein:
the multiplexing circuit includes
a plurality of switches, each of which includes one end connected to each of n data lines among the plurality of data lines and another end connected to the amplifying circuit, and performs a switching operation according to a corresponding switching signal.

7. The fingerprint and image sensor of claim 6, wherein:
the amplifying circuit includes:
a calculation amplifier, which includes a first input terminal connected to the another end of the plurality of switches, a second input terminal, to which the reference voltage is input, and an output terminal; and
a capacitor, which is connected between the first input terminal and the output terminal, and integrates a current introduced from the first input terminal and generates a corresponding output voltage.

8. The fingerprint and image sensor of claim 7, wherein:
the amplifying circuit further includes
a reset switch, which is connected to the capacitor in parallel, and is turned on during a period between on-periods of the plurality of switches.

9. The fingerprint and image sensor of claim 1, wherein:
a time period from a time point, at which a reset scan signal to control supplying the reset voltage to one of the sensor pixels is changed to an off-level, to a time point, at which a scan signal to control transferring the pixel voltage to the corresponding data line is changed to an on-level, is an exposure period determining the pixel voltage.

10. The fingerprint and image sensor of claim 9, wherein:
the reset scan signal has a predetermined phase difference with the same waveform as that of the scan signal.

11. The fingerprint and image sensor of claim 9, wherein:
the reset scan signal has the on-level at least two times during a period of one frame, and
the exposure period is a period from a time point, at which the reset scan signal is changed from the on-level of one time between at least two times to the off-level, to a time point, at which the scan signal is changed to the on-level.

12. The fingerprint and image sensor of claim 9, wherein:
the reset scan signal is the off-level during a predetermined period in a period of one frame, and the exposure period is a period from a time point, at which the reset scan signal is changed from the on-level to the off-level, to a time point, at which the scan signal is changed to the on-level.

13. A sensor pixel generating a pixel voltage according to supplied light, the sensor pixel comprising:
a photodiode, which is connected between a first contact point and a bias voltage;
a capacity capacitor, which is connected to the photodiode in parallel;
a reset transistor, which supplies a reset voltage to the first contact point according to a reset scan signal; and
a switching transistor, which transfers the pixel voltage that is a voltage of the first contact point to a data line according to a scan signal,
wherein the reset voltage is changed according to an amount of external light.

14. The sensor pixel of claim 13, wherein:
after the reset transistor is turned on while being synchronized to an on-level of the reset scan signal, and the voltage of the first contact point is reset to the reset voltage,
the pixel voltage is determined during an exposure period from a time point, at which the reset scan signal is changed to an off-level, to a time point, at which the scan signal is changed to the on-level.

15. The sensor pixel of claim 14, wherein:
the reset scan signal has a predetermined phase difference with the same waveform as that of the scan signal.

16. The sensor pixel of claim 14, wherein:
the reset scan signal has the on-level at least two times during a period of one frame, and
the exposure period is a period from a time point, at which the reset scan signal is changed from the on-level of one time between at least two times to the off-level, to a time point, at which the scan signal is changed to the on-level.

17. The sensor pixel of claim 14, wherein:
the reset scan signal is the off-level during a predetermined period in a period of one frame, and
the exposure period is a period from a time point, at which the reset scan signal is changed from the on-level to the off-level, to a time point, at which the scan signal is changed to the on-level.

18. A method of driving a fingerprint and image sensor including a plurality of sensor pixels, the method comprising:
generating a reset voltage according to an amount of external light;
supplying a reset voltage to the plurality of sensor pixels;
generating a plurality of pixel voltages according to light supplied by the plurality of sensor pixels;
transferring the plurality of pixel voltages to a plurality of data lines; and
generating a plurality of output voltages based on the plurality of pixel voltages and a reference voltage,
wherein
the generating of the plurality of pixel voltages includes
generating the plurality of pixel voltages according to light supplied by the plurality of sensor pixels during an exposure period from a time point, at which each of a plurality of reset scan signals to control supplying the reset voltage to the plurality of sensor pixels is changed to the off-level, to a time point, at which each of a plurality of scan signals to control transferring the plurality of pixel voltages to the plurality of data lines is changed to an on-level.

* * * * *